July 16, 1935. T. L. SPRAGUE 2,007,986
NAVIGATIONAL INSTRUMENT
Filed Feb. 2, 1934 4 Sheets-Sheet 1

INVENTOR
THOMAS L. SPRAGUE
BY
Harold Todd
ATTORNEY

July 16, 1935.  T. L. SPRAGUE  2,007,986
NAVIGATIONAL INSTRUMENT
Filed Feb. 2, 1934   4 Sheets-Sheet 2

INVENTOR
THOMAS L. SPRAGUE
BY
Harold Dodd
ATTORNEY

INVENTOR
THOMAS L. SPRAGUE
BY Harold Dodd
ATTORNEY

July 16, 1935.  T. L. SPRAGUE  2,007,986
NAVIGATIONAL INSTRUMENT
Filed Feb. 2, 1934  4 Sheets-Sheet 4

INVENTOR
THOMAS L. SPRAGUE
BY
Harold Dodd.
ATTORNEY

Patented July 16, 1935

2,007,986

UNITED STATES PATENT OFFICE 2,007,986

NAVIGATIONAL INSTRUMENT

Thomas L. Sprague, United States Navy

Application February 2, 1934, Serial No. 709,471

8 Claims. (Cl. 33—1)

(Granted under the act of March 3, 1883, as amended April 30, 1928; 370 O. G. 757)

This invention relates to an instrument for solving various types of problems incident to navigation, and especially to the navigation of aerial craft.

Among the objects of this invention are: to provide a means to solve by inspection the so-called wind triangle, whether true wind alone is used or the vector wind, made up of apparent wind and true wind; to provide an instrument to show the magnetic course to steer and the ground speed for any true track or vice versa; to provide means for permitting a craft to deviate from a base track and return thereto without the necessity of plotting the courses steered; to provide a device to solve readily all the so-called mooring board problems and in general to solve problems involving vectors.

Figure 1:
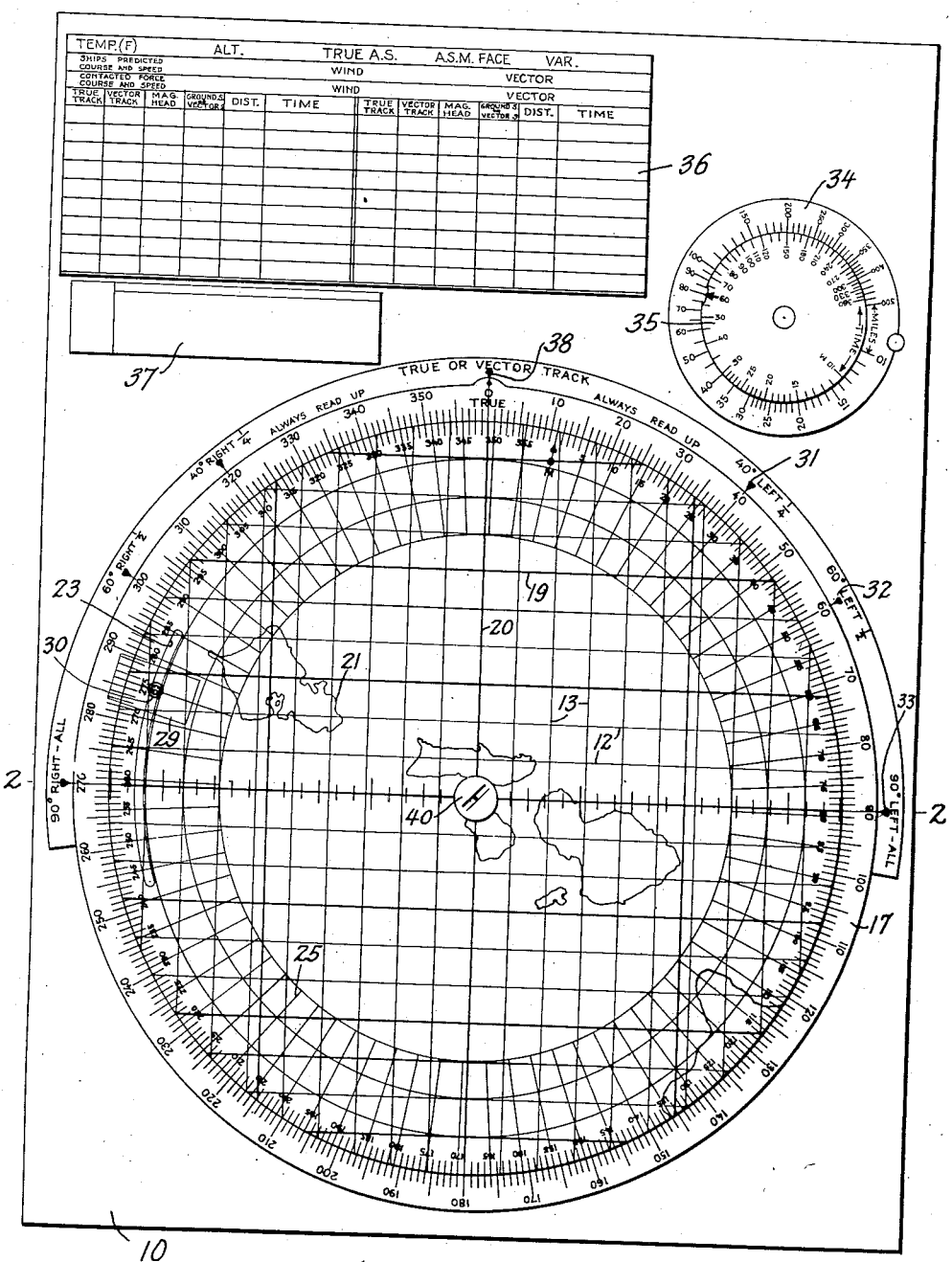
Figure 2:
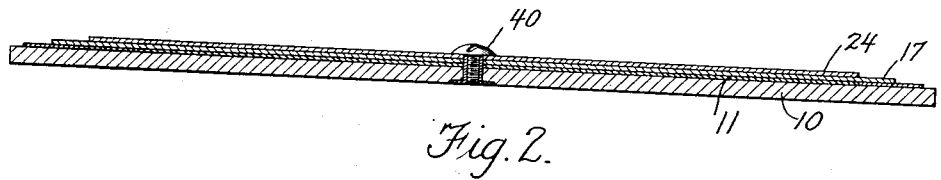
Figure 3:
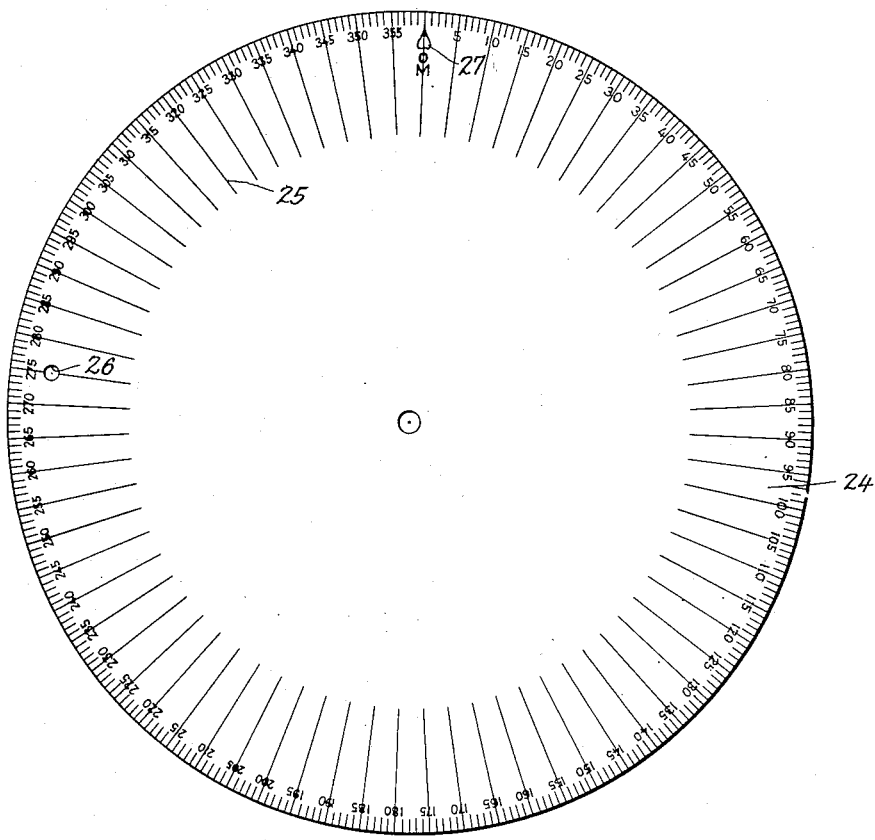
Figures 4, 5:
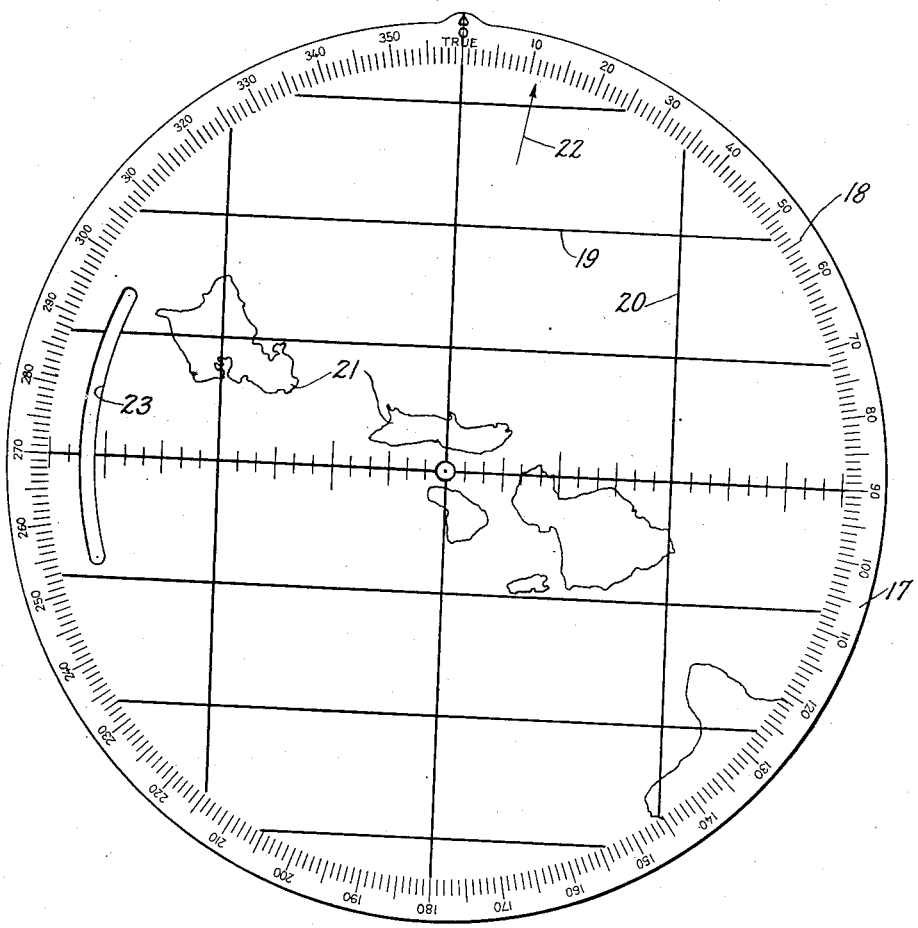
Figure 6:
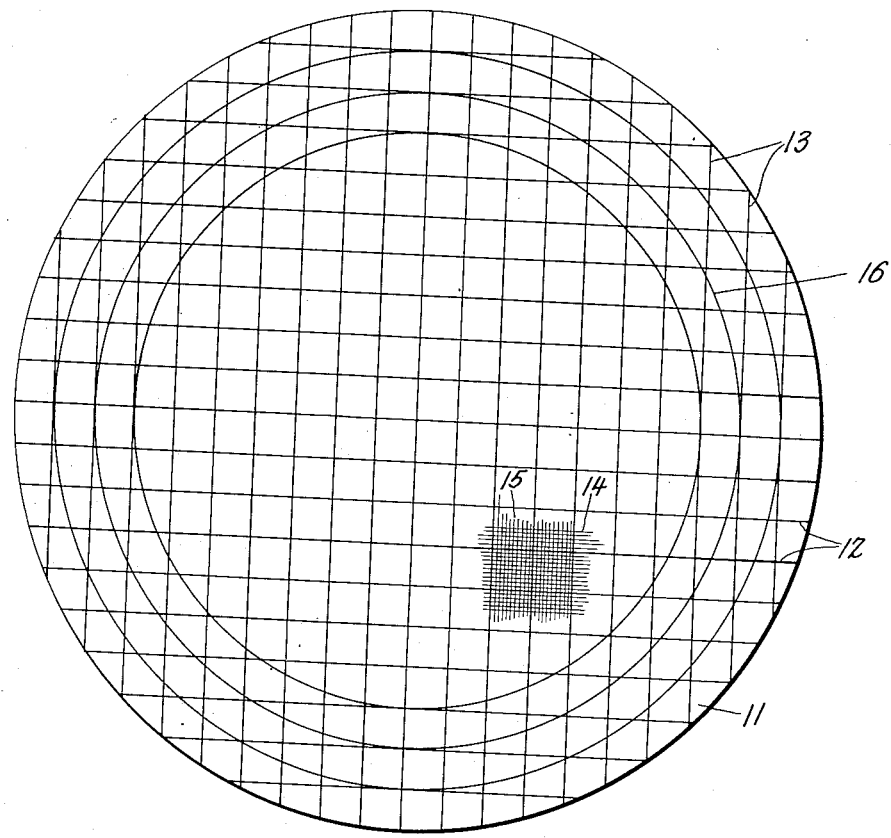
Figure 7:
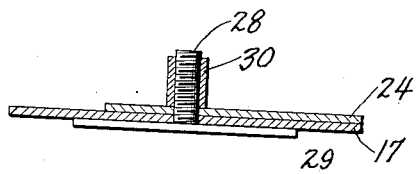

In the drawings, Fig. 1 is a plan view of the assembly of my invention; Fig. 2 is a transverse section; Fig. 3 is a plan view of the smaller or magnetic course disk; Fig. 4 is a plan view of the larger or true course disk; Fig. 5 is a fragmentary detail of the temperature and altitude correction; Fig. 6 is a plan view of the grid of my device; Fig. 7 is a detail of the means for clamping together the two rotatable disks.

As shown in Fig. 1, a base 10 of suitable material, such as ply wood or heavy cardboard, is used for mounting the various parts constituting the total assembly of my invention. A grid 11, whereon are inscribed two sets of mutually perpendicular lines 12 and 13, is fixed upon base 10. The squares formed by the lines 12 and 13 are further subdivided by subordinate lines 14 and 15, parallel respectively to the lines 12 and 13. A series of concentric circles 16 are inscribed on grid 11 to indicate speeds in suitable units, which lines will indicate preferably the speeds adjacent the usual operating range of the craft, and while but four such circles are shown, the periphery of the grid 11 constituting one of them, it will be understood that any number of such circles may be inscribed upon the grid and that such circles will not necessarily be uniformly spaced, corresponding to uniform increments of speed as are the circles shown in Fig. 6.

Rotatably mounted upon base 10 over grid 11 and held concentric with the circles 16 on the grid by pivot stud 40 is the true track disk 17, having on its periphery calibrations 18, representing units of angle. The disk 17 is of transparent material, such as glass or celluloid, with the upper face thereof roughened to be readily marked upon, and upon which face are drawn lines 19 and 20, representing latitude and longitude, respectively. When operating in any one area for a considerable length of time, a map of that region may be drawn upon disk 17, preferably with India ink to increase the visibility thereof, there being shown in Fig. 4 for purpose of illustration a group of islands generally designated by numeral 21. The map so drawn should be to scale and properly oriented with respect to the compass. If desired, an arrow 22 may be drawn on disk 17 to indicate the mean variation of the compass over the locality represented by the map. An arcuate slot 23, having an angular extent at least equal to the sum of the maximum compass variations on both sides of north, is formed in disk 17 to receive a member of the clamping device to be described hereinafter.

The magnetic course plate or disk 24 is mounted over disk 17 concentrically therewith and is substantially similar to disk 17 except that there are no lines of latitude and longitude inscribed thereon; that the five degree calibrations 25 are radially extended inwardly; that there is a hole 26 instead of a slot; and that the radius is smaller than that of disk 17. The zero calibration on disk 24 is marked by an arrow 27 and the letter M for the purpose of showing the magnetic north in any given area. The relative position of the magnetic north to the true north is shown by rotating disk 24 with respect to disk 17 until the arrow 27 on disk 24 is set at the point on disk 17 that indicates the compass variation, which in Fig. 1 is shown as being equal to 11 degrees east. The disks 17 and 24 are maintained in any desired relative position by a stud 28 whereof the shank is movable in slot 23 in disk 17 and passes through hole 26 in disk 24 and having a head 29 that underlies disk 17 and a nut 30 that engages disk 24, the clamping of the two disks between the nut and the head serving to prevent casual relative rotation thereof.

Around the upper portion of and closely adjacent the periphery of disk 17 is a fixed arcuate series of indicia 31, 32, and 33 that indicate the additional time necessary to cover a given distance along a base track when that track is deviated from at various angles and returned to at the same angles, over the time that would be required if the base track were followed. For example, indicium 31 shows that if the base track were left at an angle of 40 degrees and this course followed for a given time or distance and then the base track returned to on a course which is also at an angle of 40 degrees thereto, it has required one-fourth more time than would have been necessary to traverse the distance between the points at which the base course was left and the point at which it was intercepted upon return thereto than if the base course had been followed between those two points. It will be noted that there are two sets of these indicia, one for deviation to the left and the other for deviation to the right.

Adjacent the assembly of disks and grid heretofore described, there is mounted upon base 10 a calculating omnimeter having a fixed portion 34 and a rotatable portion 35 for converting distances into time or vice versa when the rate of travel is known. I have also provided a form 36 upon which may be recorded various essential data relating to the navigational problems to be solved, and a temperature-altitude speed correction scale 37, which is shown in more detail in Fig. 5, the particular scale illustrated being adapted for use when the usual operating speed is 80 knots.

It may be desirable in some cases to eliminate disk 24 to make grid 11 more readily visible. When this is done a mirror image of latitude lines 19, longitude lines 20 and map 21 are inscribed on the under side of disk 17, which, when viewed from the upper side of the disk in position on base 2, will show these features correctly oriented. This leaves the upper surface of the disk free for marking. Magnetic courses are indicated by writing on disk 17 radially inwardly of the true course calibrations thereon the magnetic points corresponding thereto.

Numerous methods of applying my invention to problems of the nature indicated will suggest themselves to those skilled in that art but by way of example a few illustrations of particular uses will be given. If it be desired to pass from one point on the map 21 to another point thereon the disks, which are locked together to indicate the magnetic variation, are turned until the destination is upward from the point of departure and both points lie on the same line 13 or 15; the true course between the points will then be read on disk 17 opposite the lubber's line 38, and the magnetic course will be read on disk 24 opposite the same line. The distance between such two points may be readily determined by counting the number of squares on grid 11 between the termini of the journey and converting such count into distance, according to the scale of distances chosen to be represented by the lines on the grid.

To solve the vector triangle for compass heading to make good a given course when the velocity and direction of the wind are known, the procedure is as follows: rotate the plates until the direction, on the true course disk 17, from which the wind is blowing is opposite lubber's line 38 and count upwardly from the center of the disk a number of squares equal to the number representing the wind velocity and mark the point thus found; rotate the disks until the course to be made good is opposite the lubber's line and extend an imaginary line upwardly from the wind point, previously marked, parallel to lines 15 until the speed circle 16 corresponding to the air speed of the craft is intersected; mark this point. The distance between this point and the wind point is the ground speed of the craft and is determined by counting the number of squares on grid 11 and converting such count into distance according to the scale of distances chosen to be represented by the lines on the grid. The true and magnetic heading to steer to make good the given course are found by extending an imaginary radial line to the peripheries of 17 and 24 respectively from the point previously marked on the speed circle. The radial lines 25 are employed to assist in accuracy in running the imaginary radial line. In determining the various vectors involving speed and distance, the omnimeter and the speed correction scale are used in conjunction with the disks and grid for convenient conversion of distance to time and vice versa, and also for obtaining the correct values of distances from the readings of the air speed meter. A great number of other uses will readily be apparent to the skilled navigator.

The invention herein described may be manufactured and used by or for the Government of the United States for governmental purposes without the payment of any royalty thereon.

I claim:

1. A navigational instrument, comprising a base, a grid on said base formed by two sets of lines defining rectangular areas thereon and having on it a plurality of equally spaced concentric circles, over said grid a first transparent disk having a surface prepared to be marked upon, a second like disk but of less diameter over the first disk, both of said disks being mounted for rotation about the center of said circles and having calibrations in units on their edges, there being in the first disk an arcuate slot concentric with the disk and of an angular extent equal to the sum of the maximum compass variations on both sides of north, and releasable clamping means including a stem passing through said slot and elements to engage the disks to prevent relative movement therebetween.

2. A navigational instrument, comprising a base, a grid fixed thereon having inscribed on it a plurality of equally spaced concentric circles, a first transparent disk rotatably mounted over said grid concentrically with said circles, a second rotatable transparent disk of less radius than said first disk overlying said first disk and concentric therewith, the edge of each disk being calibrated in units of angle and a surface of each disk being prepared for marking thereon, there being in said first disk an arcuate slot of angular extent at least as great as the sum of the maximum compass variations on both sides of north and a hole through said second disk, a stud extending through said hole and said slot and having a head underlying the first disk, and a nut on said stud to clamp said disks together to prevent relative rotation therebetween.

3. A navigational instrument, comprising a base, a grid fixed thereon having inscribed on it a plurality of equally spaced concentric circles, two rotatably mounted superposed transparent disks concentric with said circles, each of said disks having a surface prepared for marking thereon and having its edge calibrated in units of angle, and means to fix said disks together with the zero points thereof in the same angular relation as are true north and magnetic north at any given place.

4. A navigational instrument, comprising a base, a grid fixed thereon having inscribed on it a plurality of equally spaced concentric circles, a first transparent disk rotatably mounted over said grid concentrically with said circles, a second rotatable transparent disk of less radius than said first disk overlying said first disk and concentric therewith, the edge of each disk being calibrated in units of angle, there being inscribed on said first disk a scale map of an area correctly oriented with respect to the angle calibrations on said first disk, and means for fixing said two disks together with the zero points of said calibrations in the same angular relation as are true north and magnetic north in said area.

5. A navigational instrument, comprising a base, a grid thereon, two superposed transparent disks rotatably mounted over said grid, there being circles representing speeds inscribed on said grid concentrically with said disks, the edges of said disks being calibrated in units of angle, and means to fix said disks together with the zero points of the said calibrations in the same angular relation as are true north and magnetic north at any given place.

6. An instrument for the solution of problems by vectors, comprising a grid constituted by two mutually perpendicular sets of parallel lines, two superposed concentric transparent disks rotatably mounted over said grid, the edges of said disks being calibrated in units of angle, and means spaced from the center of rotation of said discs to secure said disks against rotation with respect to each other, said means being releasable to permit relative adjustment of said disks over a limited range.

7. Means for determining the vector course to be followed by a craft to make good a desired course having given the vector of said desired course and the vector of an external force acting upon such craft, comprising a grid formed by two sets of lines defining rectangular areas thereon, two transparent elements rotatably mounted in operative relation with said grid, said elements having each a complete perigon of calibrations in units of angle, said calibrations being disposed to facilitate the conjoint reading thereof, and means for fixing said elements with respect to each other to show compass variation at any given place.

8. A navigational instrument, comprising a base, a grid fixed thereon having inscribed on it a plurality of equally spaced concentric circles, a first transparent disk rotatably mounted over said grid concentrically with said circles, and a second rotatable transparent disk of less radius than the said first disk overlying said first disk and concentric therewith, the edge of each disk being calibrated in units of angle, there being inscribed on said first disk a scale map of an area correctly oriented with respect to the angle calibrations on said first disk.

THOMAS L. SPRAGUE.